United States Patent [19]

Hoppe

[11] Patent Number: 4,549,960
[45] Date of Patent: Oct. 29, 1985

[54] SYSTEM FOR CONDITIONING GRAIN AND MAINTAINING SAME

[76] Inventor: Gerald W. Hoppe, Box 157, St. Clair, Minn. 56080

[21] Appl. No.: 511,450

[22] Filed: Jul. 7, 1983

[51] Int. Cl.[4] .............................................. B07B 1/00
[52] U.S. Cl. .................................... 209/240; 209/244; 209/255; 209/259; 209/371; 209/372; 209/378; 209/353; 209/405; 209/414; 99/485; 99/646 S; 426/320; 426/486; 426/465; 43/125; 34/222; 34/232; 34/54; 98/57
[58] Field of Search ................. 34/222, 224, 229, 232; 98/55, 56, 57; 99/485, 646 S; 209/240, 244, 255, 259, 321, 370, 371, 372, 373, 378, 303, 405, 414; 426/486, 465

[56]           References Cited
        U.S. PATENT DOCUMENTS

|  |  |  |  |
|---|---|---|---|
| 9,564 | 1/1853 | Childs | 209/154 |
| 1,421,809 | 7/1922 | Mischke | 209/259 X |
| 1,528,983 | 3/1925 | Montgomery | 209/2 X |
| 2,466,362 | 4/1949 | Blake et al. | 98/56 |
| 2,903,955 | 9/1959 | Werner, Jr. | 98/56 |
| 2,966,110 | 12/1960 | Burfield et al. | 98/57 |
| 3,265,209 | 8/1966 | Wochnowski et al. | 209/136 |
| 3,265,210 | 8/1966 | Harte et al. | 209/136 |
| 3,361,258 | 1/1968 | Kalke | 209/234 |

FOREIGN PATENT DOCUMENTS 0939130  5/1982  U.S.S.R. ............................. 209/321

Primary Examiner—Frank W. Lutter
Assistant Examiner—Thomas M. Lithgow
Attorney, Agent, or Firm—Herman H. Bains

[57]             ABSTRACT

Apparatus for cleaning, aerating and fumigating grain comprises chutes having screens therein over which the grain is passed. Conduits interconnect the chutes with a blower mechanism so that the grain to be cleaned is subjected to a vacuum which causes the fine debris, trash and the like to be passed through the screen. The fine debris is entrained in a stream of air and directed exteriorly of the grain storage structure. The conduits connected to the blower assembly may be detached from the grain cleaning chutes and connected to tubes inserted into the grain to permit heated gases and moisture to be removed from the stored grain. An air entrained fumigant may also be directed through the tubes into the grain for controlling insects and the like.

11 Claims, 14 Drawing Figures

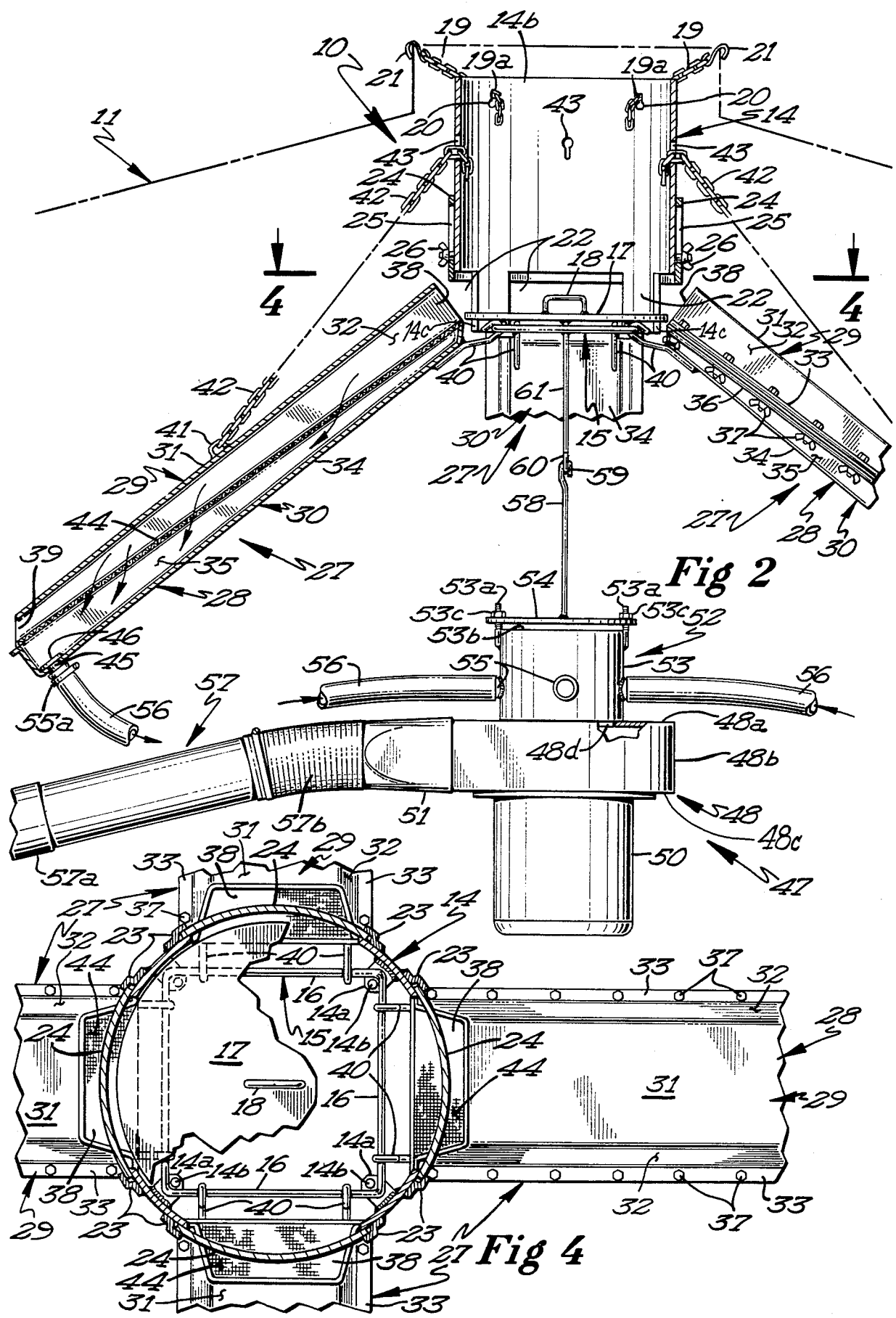

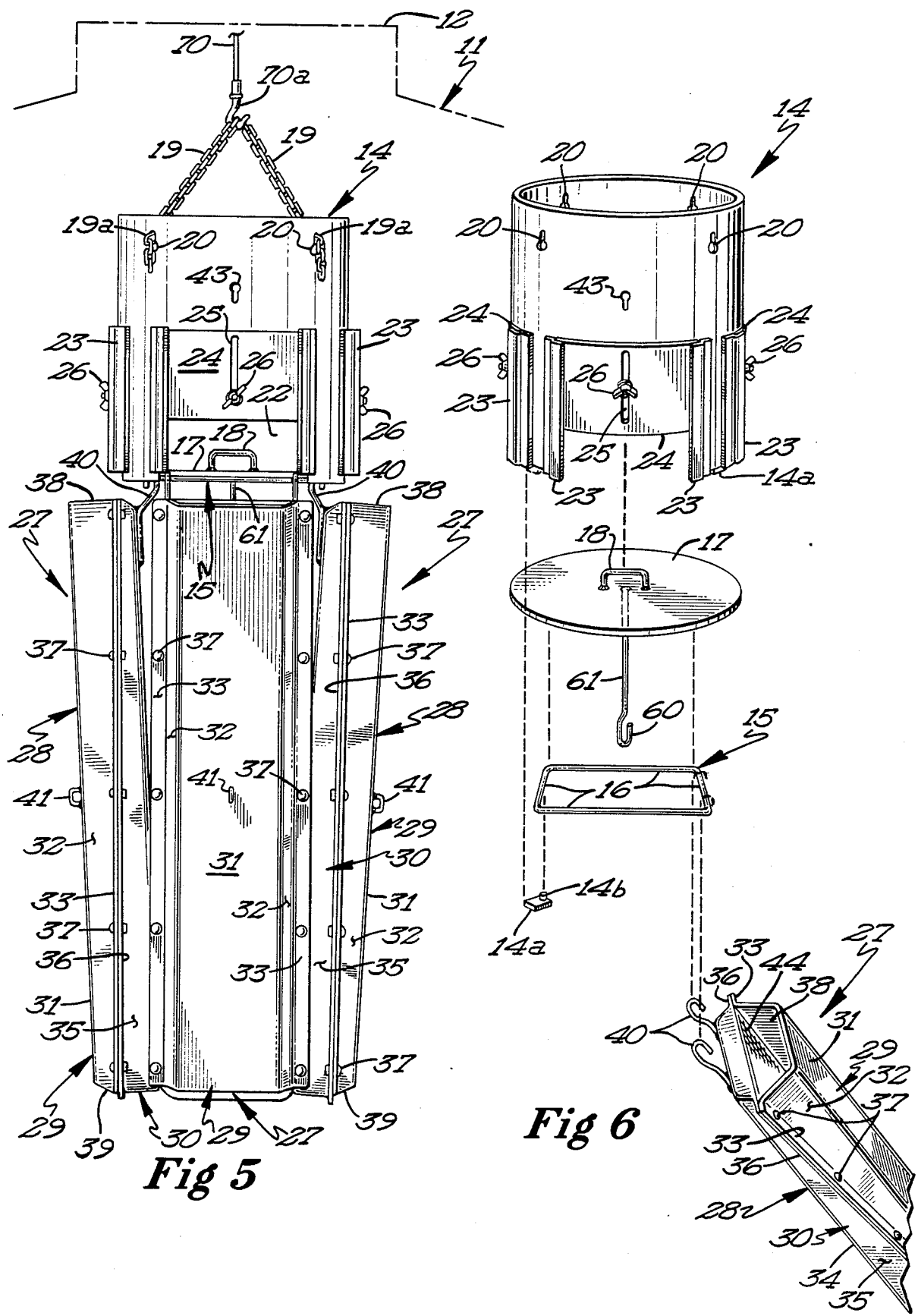

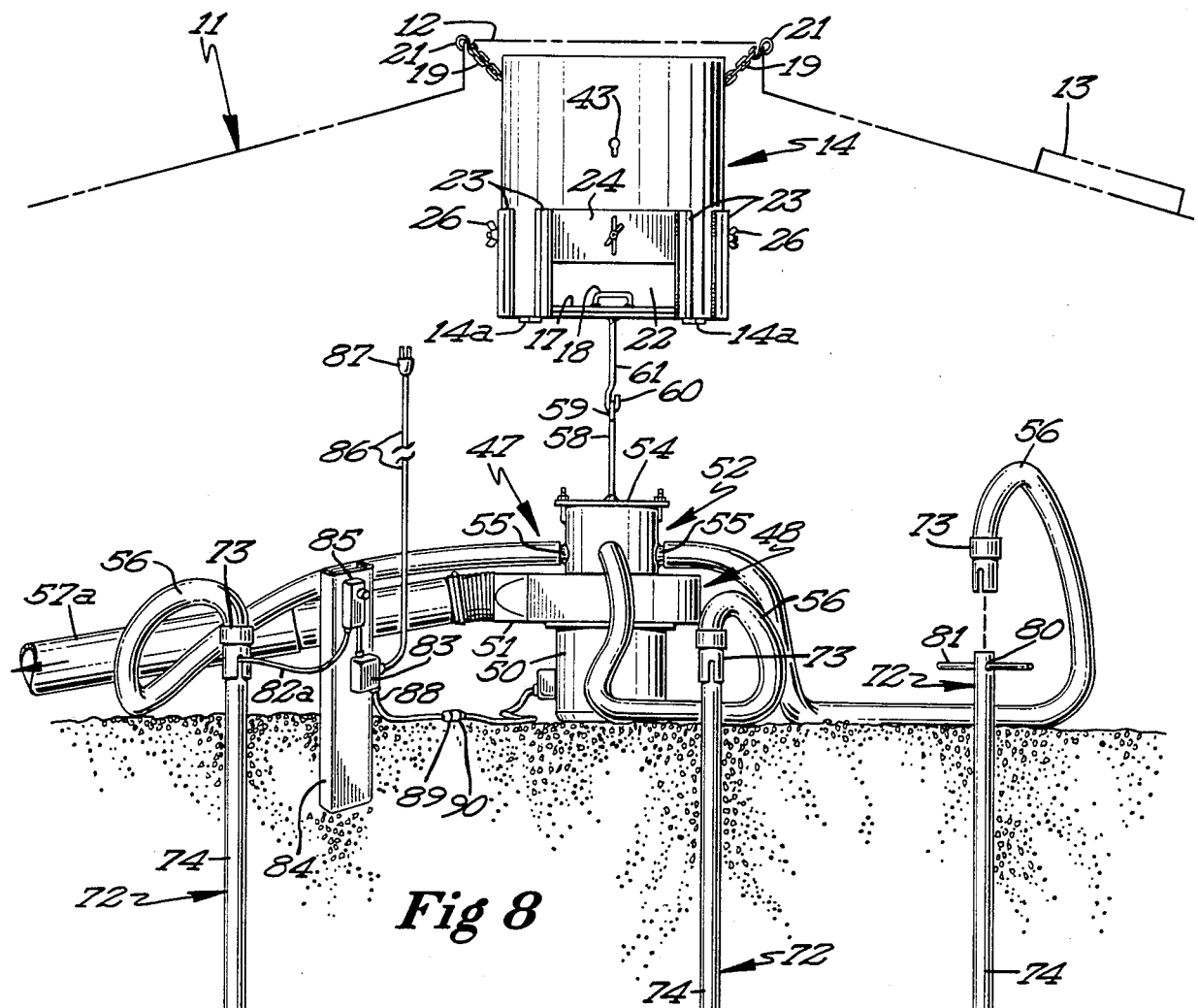
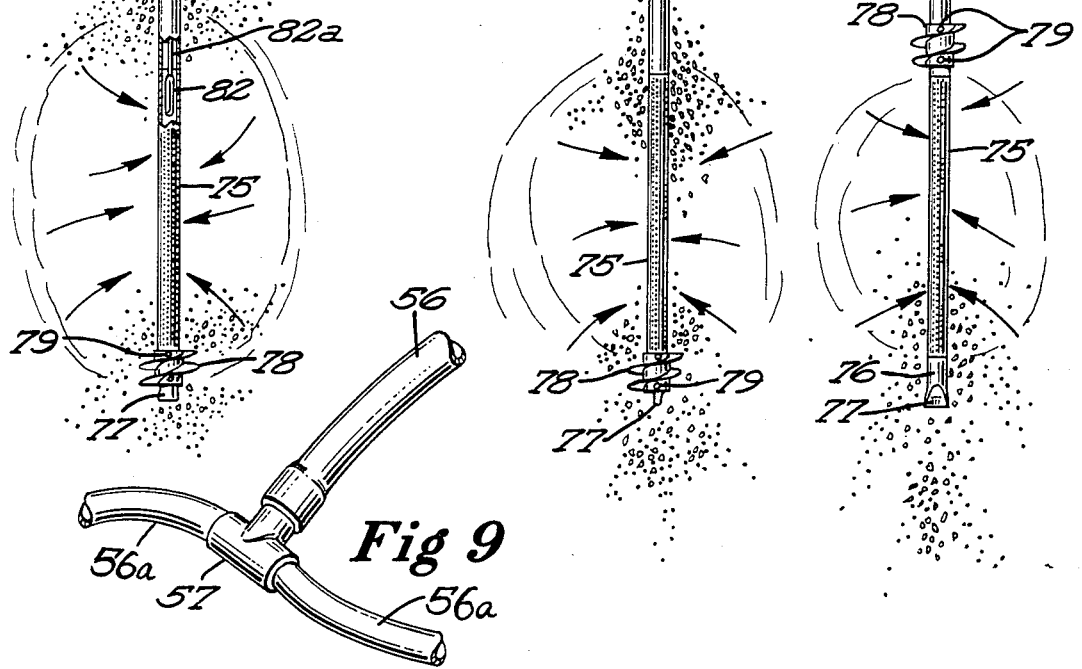
Fig 8
Fig 9

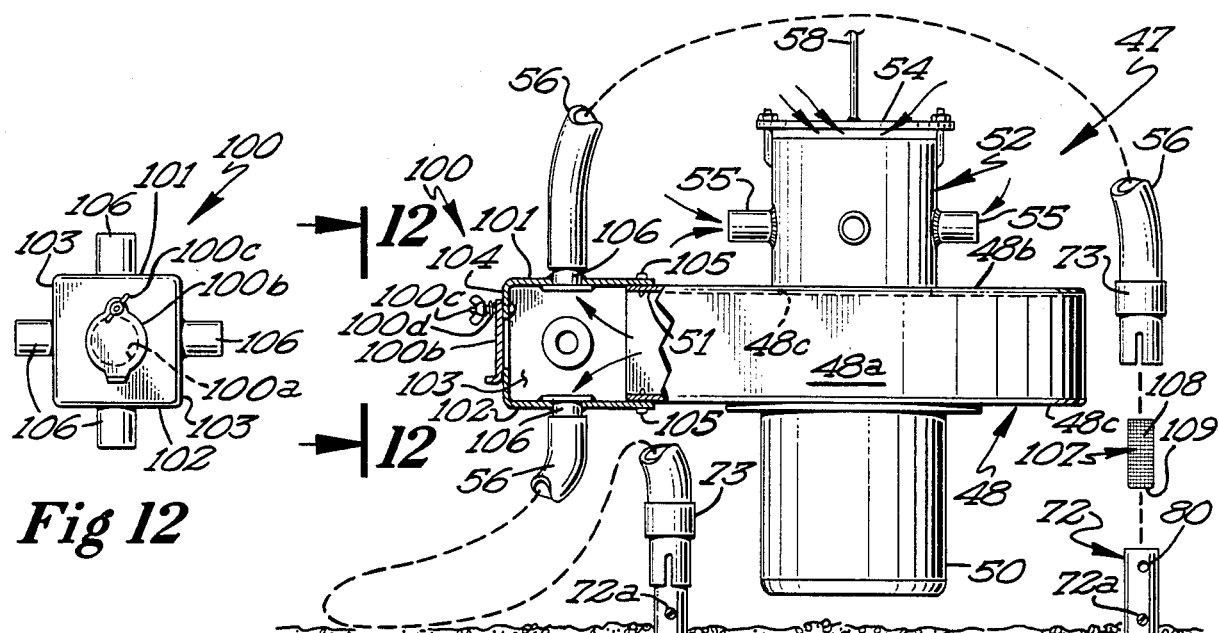
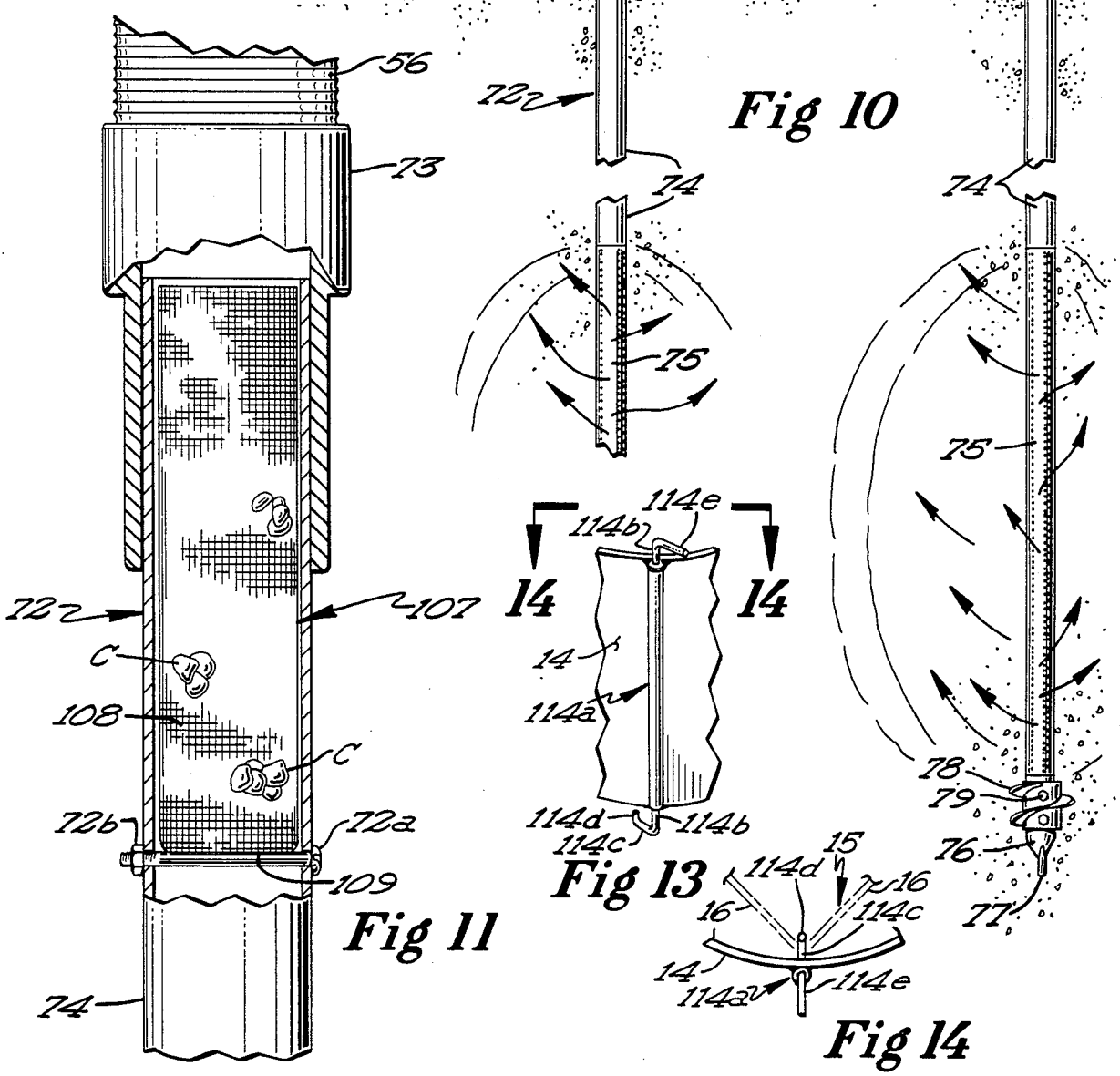

SYSTEM FOR CONDITIONING GRAIN AND MAINTAINING SAME

SUMMARY OF THE INVENTION

This invention relates to a system for cleaning grain, and more specifically to a system which may be used to clean, aerate and fumigate grain.

Certain devices have been developed which are used to clean grain prior to storage of the grain in a storage structure. Other devices have been developed and are now available for aerating the grain during storage, and still other devices are available for fumigating the grain. The purpose of all of these various devices is the preservation of the grain during storage. However, none of these devices is capable of providing a cleaning function, an aerating function and a fumigating function.

It is therefore a general object of this invention to provide a novel, portable, collapsible grain cleaning system of simple and inexpensive construction and operation, which may also be used to aerate and fumigate the grain stored in a storage structure.

A more specific object of this invention is to provide a novel grain cleaning system which screens chaff, debris, trash and the like from the grain as the grain is delivered to a storage structure, and thereafter entrains the trash and debris into a stream of air for discharge to the exterior.

Another object of this invention is the provision of a grain cleaning system with aerating tubes which may be used with the blower to aerate the grain in the storage structure when the blower is not being used in the grain cleaning operation.

Another object of this invention is to provide a grain cleaning system which when used to aerate the stored grain effectively controls the temperature and removes moisture from the storage structure.

A further object of this invention is the provision of a novel grain cleaning system having the capability of fumigating the stored grain by the delivery of a fumigant through the aerating tubes when the latter are not being used for aeration.

These and other objects and advantages of my invention will appear more fully from the following description made in conjunction with the accompanying drawings wherein like reference characters refer to the same or similar parts throughout the several views.

FIGURES OF THE DRAWING

FIG. 2 is a cross-sectional view taken approximately along line 2—2 of FIG. 1 and looking in the direction of the arrows;

FIG. 4 is a cross-sectional view taken approximately along line 4-4 of FIG. 2;

FIG. 5 is a side elevational view of the grain cleaning system illustrated in collapsed position;

FIG. 6 is an exploded perspective view of the receiver container of the grain cleaning system;

FIG. 8 is a perspective view of the blower assembly of the grain cleaning system being used to aerate grain;

FIG. 9 is a perspective view of a modified form of certain components of the blower assembly;

FIG. 10 is a fragmentary side elevational view of the blower assembly being used to fumigate grain with ceratin parts exploded, other parts foreshortened, and certain other parts broken away for clarity;

FIG. 11 is a fragmentary cross-sectional view on an enlarged scale of one of the components illustrated in FIG. 10;

FIG. 12 is a fragmentary elevational view approximately along line 12—12 of FIG. 10 and looking in the direction of the arrows;

FIG. 13 is a fragmentary elevational view of a modification of the grain receiving container; and FIG. 14 is a top elevational view along line 14—14 of FIG. 13 and looking in the direction of the arrows.

DESCRIPTION OF THE PREFERRED EMBODIMENT

Figure 1:
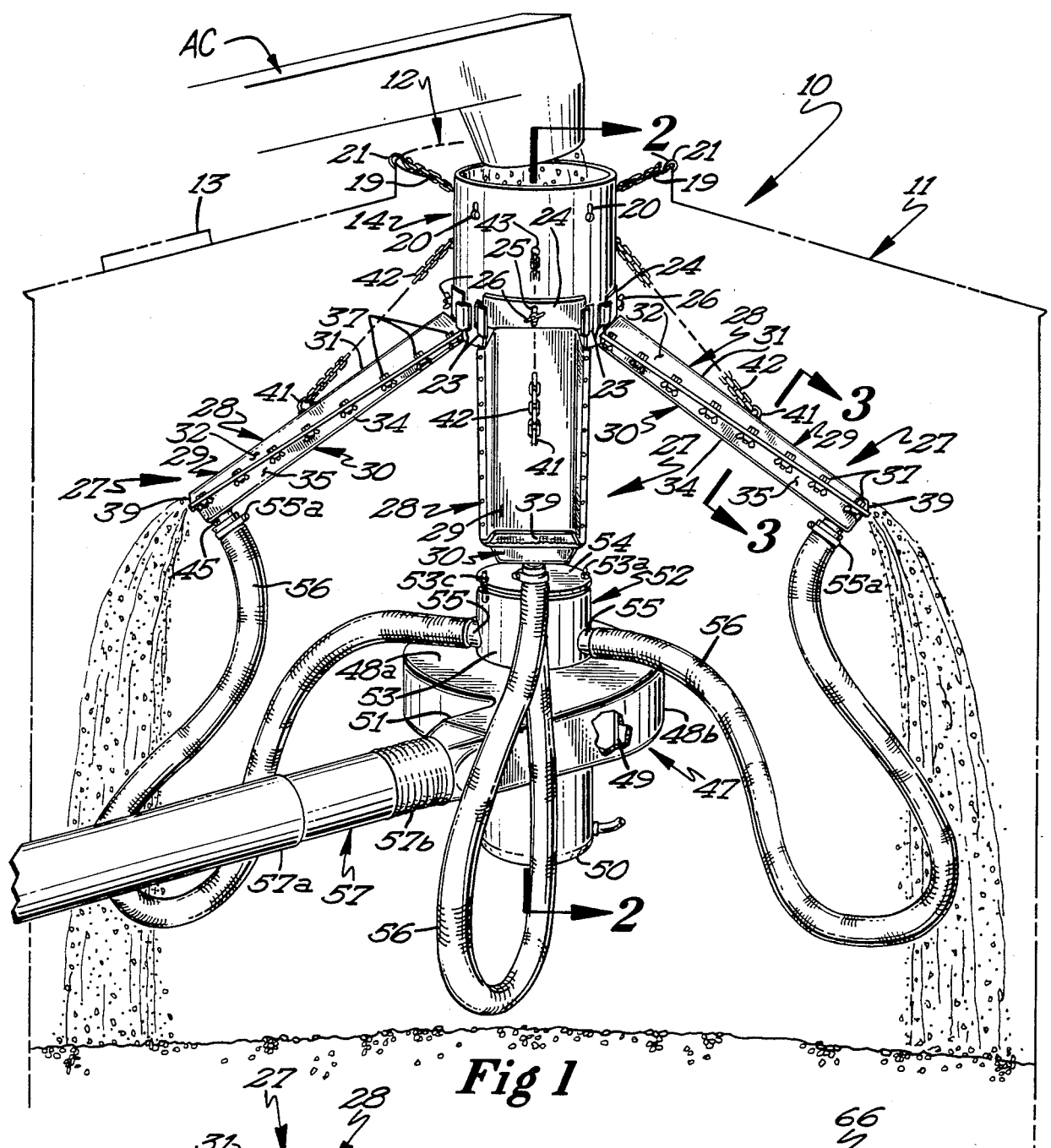
FIG. 1 is a perspective view of the novel grain cleaning system illustrated in suspended relation within a conventional grain storage bin.
Figure 3:
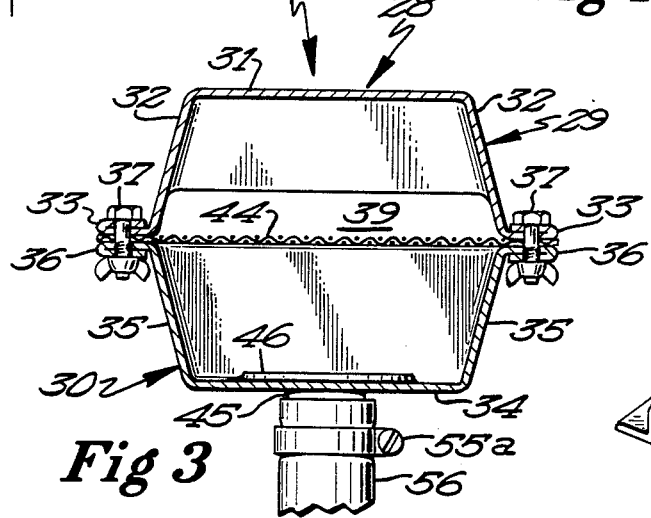
FIG. 3 is a cross-sectional view taken approximately along line 3—3 of FIG. 1 and looking in the direction of the arrows.
Figure 7:
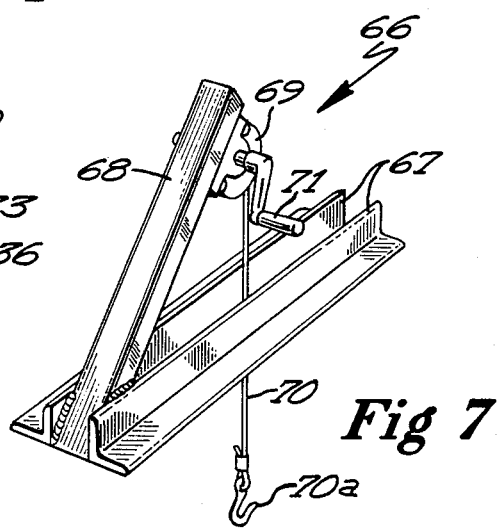
FIG. 7 is a perspective view of a winch mechanism used to elevate and suspend certain components of the grain cleaning system in the grain storage structure.

Referring now to the drawings, and more specifically to FIG. 1, it will be seen that one embodiment of the novel grain cleaning system, designated generally by the reference numeral 10, is thereshown. The grain cleaning system is suspended in a conventional grain storage structure or bin 11, which may be in the form of a grain bin or the like. The grain storage structure 11 has a conventional opening 12 at the top thereof through which grain to be stored is delivered. The grain may be delivered to the grain storage structure by any conventional means, such as an auger conveyor device AC, which is typically used in elevating grain to a storage structure. The grain storage structure or bin 11 also includes a circular opening 13 provided with a conventional hatch for closing the same.

Referring now to FIG. 2, the grain cleaning system or apparatus 10 includes a generally cylindrical, open-top, grain receiving container 14 positioned adjacent the opening 12 of the grain storage structure 11. The grain receiving container has a plurality of spaced apart brackets 14a secured to the lower edge thereof. Each bracket 14a has a pin 14b secured to the upper surface thereof and projecting upwardly therefrom. A generally rectangular chute-supporting frame 15 formed of rod stock is positioned over said pin 14b and upon said brackets 14a. The frame 15 is comprised of four rod elements 16 rigidly secured together in rectangular configuration. A generally circular bottom plate 1 is positioned upon the frame 15 and defines a floor or lower wall for the grain receiving container 14. The bottom plate is provided with a conventional handle 18 on its upper surface to facilitate removal of the bottom plate with respect to the grain receiving container 14.

Means are provided for suspending the grain cleaning apparatus 10 in the grain storage structure, and this means includes a plurality of elongate chains 19, each having one end projecting through a keyhole opening 20 in the grain receiving container 14 adjacent the upper peripheral edge thereof. The other end of each chain 19 is provided with an S-hook 21 which is adapted to engage the edge of the grain storage structure 11 which defines the opening 12 therein. In the embodiment shown, four such chains and S-hooks are provided.

The grain receiving container 14 is also provided with a plurality of outlets 22 in the cylindrical wall thereof, and, in the embodiment shown, four such outlets are provided. Each outlet 22 extends upwardly from the lower edge 14c of the container 14, and each outlet has a pair of tracks or guide elements 23 affixed to the vertical edge portions defining the outlet. The guide elements 23 are vertically oriented, and each serves to guide a gate 24 which is vertically shiftable to vary the size of the outlet during use of the apparatus. Each gate 24 is provided with a centrally located vertical slot 25 therein which extends downwardly from the upper edge of the gate, as best seen in FIG. 1. A wing nut and bolt assembly 26 projects through an opening in the grain receiving container 14 and through the slot 25 to permit releasable locking of the gate 24 in an adjusted position, as best seen in FIG. 2. With this arrangement, the amount of grain which passes through the outlet may be variously adjusted in accordance with the condition of the grain.

The grain cleaning apparatus 10 also includes a plurality of grain cleaning chutes 27 which are secured to the grain receiving container 14 and extend downwardly and outwardly therefrom. In the embodiment shown, four such chutes are provided, and each includes a chute housing 28 comprised of an upper section 29 and a lower section 30. The upper section 29 is of inverted trough-shaped configuration and includes a substantially flat top wall 31 and side walls 32 which are integral with the top wall and diverge downwardly and outwardly therefrom. The side walls terminate in outturned flanges 33. The lower section 30 is also of trough-shaped configuration, and includes a substantially flat lower wall 34, and side walls 35 which are integral with the lower wall and diverge upwardly and outwardly therefrom. The side walls 35 also terminate in outturned flanges 36. The flanges 33 of the upper section 29 and the flanges 36 of the lower section 30 are provided with suitable apertures for accommodating wing nut and bolt assemblies 37 which secure the upper and lower sections together.

Each chute 27 has an inlet 38 at its upper end and a grain outlet 39 at its lower end. Means are provided for detachably connecting the upper end portion of each chute to the grain receiving container 14, and this means includes a pair of hook elements 40 which are rigidly secured to the lower wall 34 of the lower section 30, and project upwardly therefrom. These hook elements 40 engage one of the frame elements 16 to secure the upper end portion of each chute to the grain receiving container.

Each chute 27 also has an eyelet 41 secured to the top wall 31 of the upper section 29, intermediate the ends thereof. An elongate chain 42 has its lower end secured to the eyelet 41 on each chute, and has its upper end secured to a hook 43 on the grain receiving container 14. In this regard, it will be noted that the hooks 43 are located intermediate the ends of the container. It will therefore be seen that when the hooks 40 and the chains 42 are secured to the container, each chute will extend downwardly and outwardly at an angle from the container. Further, the inlet opening 38 in the upper end of each chute will be disposed in a position to receive grain discharged through an outlet 22 in the container. The angle of declination of each chute may be adjusted by adjusting the connection of each chute and its associated hook.

Each chute 27 also has a cleaning screen 44 extending between the side walls thereof, and extending from the upper end to the lower end thereof. The cleaning screen 44 is clamped between the flanges on the upper and lower sections by the bolt assemblies 37. It will be noted that the side walls 32 of the upper section have a larger dimension at the upper end thereof and taper to a smaller dimension at the lower end thereof. Conversely, the side walls of the lower section have a smaller dimension at the upper end thereof but diverge and increase in size towards the lower end thereof. With this arrangement, the spacing between the cleaning screen 44 and the lower wall of each chute progressively increases from the upper end portion of each chute toward the lower end thereof.

The lower end portion of the lower end section 30 of each chute has an opening in the lower wall thereof which receives a cylindrical discharge spout 45 therethrough. The discharge spout has a radial flange 46 that is secured to the lower wall 34 of the lower section to dispose the opening in the cylindrical spout in registering relation with the opening in the lower wall. It will also be noted that the grain outlet 39 communicates with the interior of the chute at a location above the level of the cleaning screen 44 so that grain which is moved along the upper surface of the cleaning screen will be discharged from the outlet into the interior of the grain storage structure. It will also be appreciated that as the uncleaned grain is moved along the cleaning screen 44, chaff, trash, debris and the like will pass through the screen upon the lower wall of the lower section and will be moved and discharged out the discharge spout 45.

Means are provided for removing the trash and debris delivered through the discharge spout, and this means includes a blower assembly 47 which is comprised of a generally cylindrical blower housing 48 including a cylindrical wall 48b, top wall 48a and bottom walls 48c. A fan 49 is positioned in the housing, and is driven by an electric motor 50 secured to the bottom wall. The blower housing 48 is provided with a tangential outlet 51 and an inlet 48d in the top wall thereof.

The blower assembly also includes a generally cylindrical manifold 52 comprised of a cylindrical wall 53 and a top wall or cover 54, but has no bottom wall. The manifold 52 is secured to the top wall 48a of the blower housing 48 so that an inlet for the blower housing 48 communicates with the interior of the manifold. The cylindrical wall 53 has a plurality of circumferentially spaced apart bolts 53a secured thereto and projecting upwardly from adjacent the upper edge 53b thereof. The top wall 54 has a plurality of openings therein through which the bolts 53a project. Each bolt has a nut 53c thereon for limiting vertical movement of said top wall 54 relative to the cylindrical wall 53. The opening defined between the top wall 54 and the upper edge 53b of the cylindrical wall 53 constitutes the inlet for the blower assembly when the blower assembly is used in a grain cleaning operation.

The cylindrical wall 53 of the manifold is provided with a plurality of tubular elements or fittings 55 which project outwardly therefrom and communicate with the interior of the manifold. Each fitting 55 is connected in communicating relation with one of the spouts 45 by a hose clamp 55a of a chute 27 by one of a plurality of elongate conduits 56. The outlet 51 of the blower housing has one end of an elongate conduit 57 secured thereto, and the other end of the conduit projects through the hatch opening 13 in the grain storage structure 11. It will be noted that the conduit 57 is of telescopic construction, and the outer section 57a telescopes over the inner section. It will also be noted that the inner end of the conduit 57 is provided with a flexible coupling 57b which is connected to the outer end of the blower housing outlet 51. This allows the conduit to flex in order to extend through the outlet in the grain storage structure. The conduit 57 intercommunicates the blower outlet with the exterior. Because the exhaust conduit is flexible at one end and is telescopically extendable and retractable, it can accommodate bins of different sizes and configurations.

An elongate rod 58 has its lower end rigidly affixed to the upper surface of the top wall 54 and projects upwardly therefrom. The upper end of the rod 58 is shaped to form a hook 59 which engages the hook 60 on the lower end of an elongate rod 61. The upper end of the rod 61 is rigidly affixed to the lower surface of the bottom plate 17. It will be seen that the blower assembly is suspended from the receiver 14 by means of the rods 58 and 61. The position of the nuts 53c on the bolts 53a determine the size of the inlet opening for the blower assembly.

During operation of the apparatus, the conduits 56 will be connected to the spouts 45 of the chutes 27. The blower assembly motor 50 will be energized and grain will be delivered to the grain receiving container 14. Grain will flow outwardly through the outlets in the container 14 and will flow downwardly by action of gravity along the surfaces of the cleaning screens 44. The fines or smaller trash, debris and the like will fall through the screen and move along the lower walls of the chute, and will be discharged through the spouts 45 into the conduits 56. The clean grain will be discharged through the outlet 39 of each chute and will fall into the storage structure. The lighter chaff, trash and the like will be entrained in air and will be moved through the conduits 56, through the blower housing and will be discharged in an air entrained stream through the conduit 57 to the exterior. It will be appreciated that the cover 54 of the manifold may be adjusted to accommodate the amount of air needed to entrain debris which is removed from the grain. The cleaning operation will continue until the grain bin or storage structure is filled. When it is desirable to remove the cleaning apparatus, the chains 42 will be disengaged from the hooks 43 and the chutes may then collapse to a vertical, inoperative position. This facilitates removal of the apparatus from the grain storage structure. The entire grain cleaning apparatus may be removed, although the blower assembly may be retained to aerate the stored grain. Since the grain cleaning apparatus is collapsible and is therefore portable, it may be moved from bin to bin for cleaning and aerating grain to be stored.

Means are also provided for initially positioning the cleaning apparatus in a grain structure, and this means comprises a hoist assembly 66 which includes a pair of angle irons 67 that are laterally spaced apart and which form supports. These supports 67 are rigidly secured to a winch mounting member 68 that projects upwardly and angularly from the supports. A conventional winch 69 is mounted on the winch mounting member and has a cable 70 wound thereon. The winch is provided with a conventional handle 71.

In use, the hoist apparatus will be positioned upon the grain storage structure 11 and the supports 67 will extend across the openings 12 in the storage structure. The cable will be unwound and the lower end thereof will be provided with a conventional hook 70a which will engage two or more of the S-hooks 21 connected to the container 14. The apparatus will be hoisted to its proper position and the S-hooks will be connected to the edge defining the opening 12 to suspend the device from the grain storage structure. The upper ends of the chains 42 will be connected to the hooks 43 to adjust the chutes to the desired downwardly extending angle, and the electric motor 50 of the blower assembly will be connected to a source of electrical current. It will be appreciated that the angle of declination of the chutes may be adjusted at any time as the conditions dictate. It is also pointed out that the apparatus may be inserted through the top of the bin rather than hoisted from within the bin.

The apparatus may also be used to aerate and fumigate the grain after it has been stored. When the apparatus is used to aerate or fumigate, the conduits 56 will be disconnected from the spouts 45, but these conduits will remain connected to the fittings 55 of the manifold 52, as best seen in FIG. 8. The conduits 56 will be interconnected to a plurality of elongate tubular members 72 that extend downwardly into the grain. The tubular members are of small diameter, and in the embodiment shown each conduit 56 is provided with a hose clamp 73 which in turn is connected in communicating relation with the upper end of a tubular member 72.

Each tubular member 72 is comprised of an upper section 74, an intermediate section 75 and a lower section 76. The upper section is of imperforate construction while the intermediate section is perforated and defines a screen to permit the flow of air through the perforations therein. The lower section 76 is also of imperforate construction, and is provided with a pointed tip 77 which facilitates entry of the tubular member into the grain. In this regard, the tubular members may also be provided with a sleeve-type auger 78 which may be mounted on the tubular member at any convenient location on the upper or lower sections. It will be noted that the sleeve-type auger 78 has been illustrated in mounted relation on the lower section of one tubular member on the lower end portion of the upper section 74 of another tubular member in FIG. 8. Set screws 79 are used to mount each sleeve-type auger on a tubular member. The helical flights of the sleeve-type auger facilitate penetration of the grain by the tubular member.

In order to facilitate turning of the tubular member when the latter is screwed into the grain, the upper end portion of each tubular member is provided with opposed openings 80 therein through which an elongate handle 81 may project. It will be seen that a user may insert the handle and rotate each tubular member, preferably with the sleeve-type auger attached to the tubular member, to facilitate entry of the tubular member into the grain. The handle may then be removed and the hose fitting clamped over the upper end portion of the tubular member.

When the blower assembly is used to aerate the grain, the motor 50 will be energized and the heated moist air and gases will be pulled through the openings in the intermediate section of each tubular member and will be ultimately exhausted through the exhaust conduit 57 to the exterior. The fan motor 50 may be operated manually so that an operator may selectively turn the blower assembly motor on and off as desired.

Alternatively, a temperature responsive control may be provided for energizing the motor 50 when the temperature within the intermediate section 75 reaches a predetermined magnitude. In this regard, one or more tubular members 72 will be provided with a sensing unit 82 that is connected to a copper tubing sensor 82a that extends downwardly into a tubular member and which is connected to a contactor or switch 83 mounted on a control panel 84 positioned interiorly of the storage bin. The control panel 84 may be urged into the upper surface of the grain stored in the bin to position the control panel in an upright position. The storage panel is also provided with an adjustable thermostat 85 that is connected by a suitable conductor to the contactor 83. The contactor is also connected by an electrical conductor 86 to a source of electrical current by conventional male outlet plug 87. The contactor is also connected to the electric motor 50 by a conductor 88, the latter being formed in sections, one having a male socket element 89 connected thereto and the other section having a female socket element 90 connected thereto. When it is desirable to operate the blower assembly manually, the male socket element 89 will be plugged into the inlet providing the source of 110 V current. When this is done, the male plug 87 for the conductor 86 will be disconnected from the source of electrical current.

When the temperature control system is used to control operation of the blower assembly, the adjustable thermostat will be set at a preselected temperature reading. When this temperature is reached in the zone adjacent the sensing unit 82, the thermostat will actuate the contactor to energize the motor 50 and operate the blower assembly. The heated air, gases and moisture will be directed through the screen or perforated unit 75 upwardly through the conduits 56 and thereafter outwardly through the conduit 57 to the exterior. Thus the heated air and moisture will be exhausted from the grain and also exteriorly of the storage bin. It will be appreciated that the tubular members 72 can be moved from location to location, or that a greater number of tubular members may be used in performing the temperature control and moisture removing function.

In this regard, reference is made to FIG. 9 where a slightly modified form is shown. The embodiment illustrated in FIG. 9 increases the number of tubular members 72 which may be used with the blower assembly. It will be seen that the conduit 56 is connected to a T member which in turn has a pair of conduits 56a connected thereto. Each of the conduits 56a is also connected to the upper end of a tubular member 72. With this arrangement, the number of tubular members to be used with the blower assembly in the aerating, moisture removing and temperature controlling function may be readily varied.

It will also be appreciated that while the blower assembly 47 is used to vacuum the fine waste materials from the grain in a cleaning function, the blower assembly can be disassembled from the remaining portion of the grain cleaning assembly and may be moved from storage bin to storage bin to perform the aerating, drying and heat control function. The ready portability of the blower assembly underscores its utility in this regard. It is also pointed out that the entire grain cleaning apparatus utilizes only a single motor in its grain cleaning and aerating, drying and temperature control functions. When in use, the entire apparatus is positioned completely inside of the storage bin so that it can be operated even in inclement weather. This is not so with conventional grain cleaning apparatus. It will also be noted that the collapsibility of the entire apparatus permits it to be arranged in a package of small compass for shipping. This is also in contradistinction from many commercial grain cleaning devices which are cumbersome both in use and when packaged for shipping.

When the apparatus is used for cleaning grain, the air entrained fine waste materials may be exhausted through the conduit 57 exteriorly of the storage bin into a truck, wagon or other vehicle, as desired. It is also pointed out that an operator may use different screens 44 in the chutes 27, depending on the kind and condition of the grain being cleaned.

Referring now to FIGS. 10 and 11, it will be seen that the blower assembly may also be used to fumigate grain stored in the storage bin. The stored grain is fumigated for the purpose of controlling certain parasites, including insects, fungi and the like, which are typically found in a central area of the stored grain. When the blower assembly is used to fumigate, four of the tubular members 72 will be inserted into the stored grain in a pattern generally around the target area to be fumigated. The blower assembly 47 may be suspended from the grain receiving container, but the conduits 56 will be disconnected from the fittings 55 on the manifold 52. A generally rectangular shaped manifold 100 will be mounted on the outlet 51 of the blower assembly housing 48. The manifold 100 includes an upper wall 101, a lower wall 102, opposed side walls 103 and end wall 104. The manifold 100 has an open side opposite the end wall 104 and the manifold will be slipped over the end portion of the outlet 51 of the blower housing. Suitable screws 105 secure the manifold to the blower housing outlet.

The manifold 100 is also provided with tubular fittings 106 which are of a size and shape substantially identical to the tubular fittings 55. In the embodiment shown, the manifold 100 is provided with four such fittings. The manifold 100 also has an inlet opening 100a in the end wall 104. A valve plate 100b is pivoted on the end wall 104 by a wing nut assembly 100c to permit pivoting of the plate between opened and closed positions with respect to the opening 100a. A spring 100d resists loosening of the wing nut assembly as a result of vibration. One end portion of each of the conduits 56 is connected in communicating relation with one of the fittings 106. The other end portion of the conduit 56 will be connected by the hose clamp 73 to the upper end portion of one of the tubular members 72. It is again pointed out that the tubular member 72 will be inserted into the grain in the central target area to be fumigated.

It will be seen that the upper end portion of each tubular member will be provided with a perforated wire container 107 which is inserted therein and which is adapted to contain a supply of solid fumigant crystals which sublimate into a gaseous fumigant. The container 107 is of generally cylindrical construction, may be formed of wire mesh and includes a cylindrical, upstanding, continuous side wall 108 and a bottom wall 109. A bolt 72a extends through aligned openings in each tubular member 72, and each bolt is secured in place by nut 72b. The container 107 is positioned upon the bolt 72a and retained in this position during the fumigating operation.

During operation, each of the containers 107 for the tubular member 72 will have a predetermined amount of solid crystaline fumigant therein which sublimates into a gas. The fan motor 50 will be energized to operate the fan, and air under pressure will be directed through the blower housing outlet 51 into the manifold 100 and thereafter through the conduits 56 into the tubular member 72. The fumigant will be entrained in the air and will be discharged through the perforate portions 75 of the tubular members into the grain. The central core target area of the grain will be penetrated with the fumigant for a predetermined period of time, and this treatment will destroy insects, such as weevils and the like. An example of the fumigant is aluminum phosphide sold under the trademark Phostoxin by Degeset American, Inc., Weyers Cave, VA. It will be appreciated that air from the interior of the storage structure will enter through the opening at the top of the manifold 52 and through the fitting 55 therein. After the operation is completed, the containers 107 may be removed from the tubular members and the manifold 100 may be removed from mounted relation on the outlet 51. The blower assembly may then be used in a grain cleaning operation or in an aerating operation.

Referring now to FIGS. 13 and 14, it will be seen that a modified form of the grain receiving container is thereshown. In this modification, different means are provided for supporting the rectangular chute/supporting frame 15. This means includes a plurality of tubular members 114a which are rigidly secured to the exterior surface of the grain receiving container 14 and which are arranged in vertically extending relation therewith. In the embodiment, four such tubular members are provided, and each is spaced equidistant apart. Each tubular member may extend the full height of the grain receiving container, as illustrated in FIG. 13, or may be of shorter length, as desired.

Each tubular member accommodates an elongated rod 114b therein which is provided with an offset portion 114c at its lower end. This lower end portion 114c is bent at right angles to the rod 114b and terminates in an upturned end portion 114d. The upper end portion of each elongate rod is provided with an offset portion 114e bent at right angles thereto, and which functions as a handle. It will be seen that the rods 114b may be pivoted or rotated about their longitudinal axes so that the lower end portions thereof project radially inwardly therefrom and will support corner portions of the chute-supporting frame 15. In some instances, it will be desirable to pivot the lower end portion of each rod so that it does not obstruct the interior opening defined by the grain-receiving container 14. This is done to permit the entire blower assembly to be lowered through the grain-receiving container, or removal of the blower assembly therefrom. In performing this operation, it is only necessary to pivot each rod 114a so that the lower end portion thereof is no longer positioned in obstructing relation with respect to the interior of the grain-receiving container.

It has been found that one of the problems involved with grain storage is changes in weather during the storage period. Such changes result in moisture migration when heat is generated by the grain. Farmers and others who store grain are therefore required to check the temperature of the grain during these changes in the weather. In my system, the temperature is automatically sensed and moisture is removed by my sensing device and blower assembly. The advantage is not found in prior art systems.

From the foregoing description, it will be seen that I have provided a novel grain cleaning and aerating system which is not only of simple and inexpensive construction and operation, but one which functions in a more efficient manner than any heretofore known comparable system.

While the preferred embodiments of the present invention have been described, it should be understood that various changes, adaptions and modifications may be made therein without departing from the spirit of the invention and the scope of the appended claims.

What is claimed is:

1. A portable, collapsible apparatus for cleaning grain delivered to a storage structure, comprising:

means mounted within sdid storage structure and adjacent an opening in the top of said grain storage structure for receiving grain therein to be cleaned, said receiving means having discharge means through which grain is discharged;

a plurality of elongate, downwardly declined cleaning chutes, means connecting said chutes with said grain receiving means, each chute having an inlet at its upper end portion thereof positioned closely adjacent said receiving means, each chute having an elongate screen extending transversely of the chute throughout substantially the length thereof, said chute inlet being located above said screen for receiving grain from the receiving means, a grain outlet at the lower end of said chute located above said screen, a trash outlet at the lower end of said chute located below said screen, whereby grain passing through the inlet of the chute will be moved along the surface of the screen and will be discharged through the grain outlet into the storage structure, and trash and fine materials will pass through the screen and through the trash outlet;

a plurality of elongate delivery conduits, each having one end thereof adapted to be connected in communicating relation with said trash outlet;

a blower assembly, including a blower housing having a blower fan therein, and having a discharge outlet, means communicating the discharge outlet with the exterior of the storage bin, means connecting the other end of each of said delivery conduits with said blower assembly whereby when the blower fan is operated it will be capable of entraining said trash and fine materials in a stream of air and discharging them exteriorly of the grain storage structure.

2. The apparatus as defined in claim 1 and a plurality of elongate substantially rigid tubular members having perforations therein and adapted to be inserted into the grain stored in the storage structure, each of said delivery conduits having said one end thereof adapted to be connected in communicating relation with one of said tubular members whereby when said blower assembly is operated it will be capable of removing moisture, heated air and gases from the grain through said tubular members and discharging them exteriorly of the grain storage structure.

3. The apparatus as defined in claim 2 wherein each of said tubular members is provided with a detachable sleeve type auger attachably mounted thereon and having helical flights to facilitate penetration of each tubular member into the grain.

4. The apparatus as defined in claim 2 and a temperature responsive control means including a temperature sensor positioned in a tubular member and connected with said blower assembly and being operable when the temperature of the grain adjacent said sensor reaches a predetermined magnitude to energize the blower assembly and cause heated moisture, air and gases to be removed from the grain.

5. The apparatus as defined in claim 1 wherein said means connecting each of said cleaning chutes with said grain receiving means is readily detachable from the grain receiving means to permit said chutes to be collapsed to a vertical position.

6. The apparatus as defined in claim 1 and means extending between and interconnecting said blower assembly in suspended relation from said grain receiving means.

7. The apparatus as defined in claim 1 wherein each chute includes an upper wall, a lower wall, and opposed side walls, said screen for each chute extending between the side walls and being spaced from the upper and lower walls thereof.

8. The apparatus as defined in claim 7 wherein said trash outlet for each chute is located in the lower wall thereof.

9. The apparatus as defined in claim 1 wherein the screen for each chute has an upper end positioned closely adjacent the inlet of the associated chute.

10. The apparatus as defined in claim 1 wherein each chute is of substantially uniform cross-sectional configuration throughout its length, said screen for each chute being inclined from the upper end of the chute towards the lower end thereof.

11. The apparatus as defined in claim 1 wherein said grain receiving means is of cylindrical configuration and is vertically disposed in the storage structure, a bottom plate positioned in the lower end portion of said grain receiving means, a plurality of outlets in said grain receiving means defining the discharge means thereof, a plurality of adjustable gates on said grain receiving means, each positioned adjacent one of said outlets for adjusting the size of the latter.

* * * * *